United States Patent
Knox

(10) Patent No.: US 6,398,861 B1
(45) Date of Patent: Jun. 4, 2002

(54) METAL PIGMENT COMPOSITION

(75) Inventor: Jonathan Joseph Whistler Knox, Fife (GB)

(73) Assignee: Silberline Limited, Edinburgh (GB)

(*) Notice: Subject to any disclaimer, the term of this patent is extended or adjusted under 35 U.S.C. 154(b) by 0 days.

(21) Appl. No.: 09/284,389

(22) PCT Filed: Oct. 22, 1997

(86) PCT No.: PCT/GB97/02912

§ 371 (c)(1),
(2), (4) Date: Apr. 13, 1999

(87) PCT Pub. No.: WO98/17731

PCT Pub. Date: Apr. 30, 1998

(30) Foreign Application Priority Data

Oct. 22, 1996 (GB) ................................. 9621954

(51) Int. Cl.⁷ .............................. C09C 1/62; C09C 1/64; C09D 17/00
(52) U.S. Cl. ........................ 106/404; 106/403
(58) Field of Search ................... 106/403, 404

(56) References Cited

U.S. PATENT DOCUMENTS

| | | | | |
|---|---|---|---|---|
| 2,858,230 A | | 10/1958 | Knoll et al. ................. 106/207 |
| 3,901,688 A | * | 8/1975 | Casey et al. .................... 75/0.5 |
| 4,350,535 A | * | 9/1982 | Ishijima et al. ............. 106/308 |
| 4,725,317 A | * | 2/1988 | Wheeler ..................... 106/290 |

FOREIGN PATENT DOCUMENTS

| | | |
|---|---|---|
| DE | 1124619 | 1/1962 |
| DE | 11 24 619 | 3/1962 |
| EP | 0104075 A1 | 3/1984 |
| FR | 2662702 A1 | 6/1991 |
| GB | 1191204 | 5/1970 |
| GB | 1191205 | 5/1970 |
| WO | 94/28074 | 8/1994 |

OTHER PUBLICATIONS

Derwent Abstract, JP 58 168 663, Asahi Eckart, Oct. 5, 1983.

* cited by examiner

Primary Examiner—Anthony Green
(74) Attorney, Agent, or Firm—Ratner & Prestia

(57) ABSTRACT

There is provided a process for preparing a low- or non-dusting substantially non-volatile (preferably highly light reflective) metal flake pigment composition, which comprises ball milling atomized metal powder in a milling fluid substantially comprised of water, in the presence of one or more corrosion inhibitors and a substance which acts as a lubricant for the milling process. Optionally, the paste may be formed into granules for easy storage. Preferred metal pigments are aluminum or gold bronze and in one embodiment the metal pigment is aluminum, the lubricant is oleic acid and the corrosion inhibitor is a phosphate ester having a polyethylene oxide side chain. Agent(s) having both lubricating and corrosion inhibiting properties are preferred as additives.

21 Claims, No Drawings

METAL PIGMENT COMPOSITION

This application is the U.S. national phase application of PCT International Application No. PCT/GB97/02912 filed Oct. 22, 1997.

The present invention relates to a process for preparing low- or non-dusting, substantially non-volatile highly light reflective metal pigment compositions by a ball milling process using water as the major milling fluid.

The preparation of metal flake pigments is well documented in the patent literature. For example, U.S. Pat. No. 3901688 describes a wet ball milling process in which metal powder or chopped foil is milled with an organic liquid such as mineral spirits and a small amount of a lubricant such as stearic or oleic acid. The metal flakes so produced are separated, for example by wet sieving to provide the desired particle size distribution and thereafter brought to a paste-like consistency of, typically, 55–80% weight metal content. In this conventional process the lubricant is required to avoid cold welding of the metal flakes under the action of the grinding media. The purpose of the organic liquid is to reduce the viscosity of the system, enabling efficient conversion of the starting powder to flakes.

Metal flakes may also be prepared in the complete absence of solvent by a dry ball milling process, such as that described in U.S. Pat. No. 4115107.

A further method of preparation of metal flake is by electrodeposition of a thin film of metal onto an inert support, followed by removal and fragmentation into flakes. The product is generally provided either as dry flake or as a dispersion of the metal flakes in solvent.

The aforementioned methods for preparing metal flake pigments suffer from a number of disadvantages. For example, dry milling processes are now little used, due to the explosive and contaminating properties of the dry flake products. Though the paste form, in which the metal flake particles are damped by solvent, is inherently safer and easier to handle, it is not without problems. The 20–45% by weight solvent portion of metal pigment pastes may be acceptable in certain coating applications such as automotive paints, but in others, especially printing inks, such solvents typically slow down the drying rate and may cause odour in the final printed film, due to retention of minute concentrations of these typically high boiling point solvents. This is especially disadvantageous in printed films on packaging intended for food contact. The presence of organic solvent in other application areas, such as plastics, can also be very undesirable. The solvent vaporises during processing, causing bubbles and surface blemishes in the pigmented plastic article.

Flake formation by the electrodeposition process can give very bright flakes of narrow particle size distribution, but it is a very costly process, unsuited to large scale production. This is because the equipment required to maintain the hight vacuum environment in which the metal is vaporised is very expensive to construct and operate.

It is also found that the storage stability of the metal pigment pastes themselves is finite, due to the tendency of the organic solvent component to evaporate, leading to aggregation of the metal flake particles. This is especially true for pastes in which a more highly volatile solvent has been employed, perhaps to ensure the compatibility of the metal pigment paste in a particular coating system. Once aggregated, redispersion is difficult. In derived coatings, hiding power, or opacity, and also gloss, may be greatly reduced.

Increasingly too, environmental concern about organic solvent is leading to legislation which encourages a lower use of volatile solvents in industrial processes. The costs associated with solvent purchase, storage and recovery are increasing. Containment equipment, required to meet increasingly severe legislative constraints on the emission of solvent to the atmosphere is expensive. As a result replacement of organic solvents by water is a strategic goal in many industries.

Recent changes in health and safety classifications require a number of high boiling point petroleum derived hydrocarbon solvents traditionally used in metal pigment manufacture to be designated carcinogenic. This increases the pressure for their elimination from metal flake pigment manufacturing processes.

The need for a stable, safe and easily handled product metal pigment form, free of the disadvantages of both dry flakes and solvent containing pastes has been met by the products of European Patent 0134676. There is described therein a process for the preparation of a solid low- or non-dusting, metal pigment composition which comprises forming a coherent paste of an organic binder medium, an organic liquid vehicle and metal pigment, in powder or flake form, the paste being formed by mixing a first component comprising organic binder medium and a second component comprising metal pigment, with either or both of the first and second components comprising organic liquid vehicle and the paste containing from 3–45% of the organic binder medium based on the weight of the metal pigment, and either sub-dividing the coherent paste-into particles and removing substantially all organic liquid vehicle from the particles, or removing substantially all the organic liquid vehicle from the coherent paste and sub-diving the resulting mass into particles, at least 98% by weight of the resulting particles being retained on a sieve having a 150 μm aperture and each containing a plurality of metal pigment particles dispersed in a matrix of organic binder medium. The so-called "granule" products of this process can be prepared using organic binder media compatible with the end application. Thus, for example, synthetic aldehyde and ketone resins could be employed for ink applications and polyolefin derivatives for the mass pigmentation of thermoplastics.

Though the products of European Patent 0134676 are substantially free of organic solvent, the process itself still involves processing of solvent. It is thus still subject to the aforementioned legislative pressures. There is therefore a clear need for a process for preparing an easily handled, dust free, metal pigment product, which does not employ organic solvents.

It is possible to prepare a dust free, metal pigment product without the use of organic solvents if the metal pigment is prepared by dry milling and thereafter incorporated into a suitable organic carrier material by mixing at a temperature above the melting point of the organic carrier. Once a homogeneous mixture has been attained, the mass is cooled, often with extrusion into a more easily handled form, such as granules or pellets. Such processes were once widely employed for the preparation of plastics masterbatch. The need to use dry metal pigments, with their attendant disadvantages, and the difficulty of wetting such pigments satisfactorily into the carrier resin, have contributed to the decline in this type of process. Although the problem of metal flake dusting may be reduced if the metal powder precursor is milled in the presence of the carrier resin, methods traditionally used to separate wanted from unwanted particle size fraction, such as dilution with solvent and screening, are then no longer operable.

A more satisfactory processing liquid is water. It is readily available, inexpensive and nonflammable. However, a difficulty arises in the case of the more reactive metal pigments, especially aluminum, which is the most widely used of such pigments. Aluminum metal may react with water to form aluminum oxide and hydrogen gas, according to the equation:

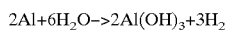

$$2Al + 6H_2O \rightarrow 2Al(OH)_3 + 3H_2$$

Generation of hydrogen is dangerous, because it is highly explosive. Sealed containers of aqueous metal pigment pastes may become pressurised and explode. In addition, the pigmentary properties of the metal flake are destroyed.

Many attempts have been made to stabilise aluminum against this reaction. Methods employed fall into several categories, for example resin encapsulation or chemical treatment. As an example of the former, there may be mentioned U.S. Pat. No. 4213886. Prominent types of chemical treatment are silica coating (see, for example, U.S. Pat. No. 2885366), treatment with chromium derivatives (German Patent 3636183), phosphate treatment, described in European Patent 0319971 and vanadium treatment (European Patent 0104075).

Milling aluminum powder in a mixture of water and an organic solvent has been described in U.S. Pat. No. 3565655. Morpholine is used as a corrosion inhibitor with a fatty acid as the milling lubricant. However, the presence of at least 2 weight percent of a hydrocarbon or a halogenated hydrocarbon is a necessary part of the invention.

U.S. Pat. No. 4693754 describes the milling of aluminum powder in a mixture of hydrocarbons, water, and a compound of chromium or vanadium which acts as a corrosion inhibitor. However again the presence of some organic solvent in the milling process is a component part of-the invention.

In WO-A-94/28074 there is described for the avoidance of odour the milling of aluminum powder, optionally with solvent or water, without a fatty acid lubricant, but in the presence of a polymer resin that is a paint or ink binder. This Patent Application does not include the use of a corrosion inhibitor in the milling process. In the absence of a corrosion inhibitor, water milled aluminum pigments are prone to severe gassing and result in products having a dull grey colour, in contrast to the bright metallic effects desired for decorative metallic finishes.

There is, therefore, still a need for a satisfactory process which can be used for milling aluminum powder and the like without organic solvent.

According to the present invention, there is provided a process for preparing a low- or non-dusting, substantially non-volatile (preferably highly light reflective) metal flake pigment composition, which comprises ball milling atomised metal powder in a milling fluid substantially comprised of water, in the presence of one or more corrosion inhibitors and a substance which acts as a lubricant for the milling process.

Thereafter, unwanted oversize or undersize particles may be removed. In the next stage of the process the aqueous metal pigment slurry may be used unaltered, may be converted to a dry metal flake pigment powder by removal of the milling fluid, for example at elevated temperature, or is preferably concentrated to a pastelike consistency. The metal flake pigment can be incorporated in an organic binder medium by mixing to form a coherent paste of an organic binder medium, water and metal flake pigment, the paste being formed by mixing a first component comprising organic binder medium and a second component comprising metal pigment, with either or both of the first and second components comprising water and the paste containing from 1 to 150%, preferably 3–70%, and most preferably 30 to 60% of the organic binder medium based on the weight of the metal pigment, and either sub-dividing the coherent paste into particles and removing substantially all volatile liquids from the particles, or removing substantially all the volatile liquids from the coherent paste and sub-dividing the resulting mass into particles, at least 98% by weight of the resulting particles being retained on a sieve having 150 $\mu$m aperture and each containing a plurality of metal pigment particles dispersed in a matrix of organic binder medium, the organic binder medium being capable of binding the metal flake pigment particles by either precipitation from solution during volatile liquid removal, or melting or sintering at elevated temperature and fusion.

The volatile liquid will usually consist substantially of water. For example, the volatile liquid may be water together with small amounts of additives, for example lower alcohols as wetting agents and resin solubilisers and dispersers.

The milling fluid used in the present invention consists substantially of water. The presence of up to 50% by volume (for example up to 30%, especially up to 25%, more especially up to 10%) of an organic solvent can usually be tolerated. A small amount (for example less than 2%) of an organic solvent is generally acceptable. Lower alcohols are especially useful as defoaming agents. Any such organic solvent is desirably water miscible. In one embodiment the milling fluid consists only of water and the system contains no organic liquid at all, the only organic compounds present being additives such as the lubricant(s), corrosion inhibitor (s) etc.

One of the advantages of the process of the present invention is the possibility of treating the milled flakes whilst in an aqueous system. For example, the milled flakes can be chromate treated or coated with silica or alumina prior to any granule formation. Such a process enables the pigments to be rendered suitable for different applications or to have different colour characteristics. Such aqueous treatments are known in the art, but tend to be difficult and expensive to carry out since the traditional milling fluid must be removed before the pigments can be treated in an aqueous medium. Since the milling process of the present invention is carried out in water, such treatments are simple to conduct.

The substantially aqueously carried product of the milling step could be added to surface coating binders dissolved or dispersed in water, solvent or mixtures of the two, to prepare a surface coating, such as an ink or paint. The reaction of certain metal flake pigments, notably aluminum, is, however unpredictable. As such a surface coating contains a proportion of water there exists the possibility that reactions may occur during storage, with the formation of hydrogen gas and associated hazards.

It is a further advantage of the process of the invention that water is substantially eliminated from contact and potential reaction with the metal pigment through the formation of the substantially non-volatile metal pigment composition.

Metals suitable for the performance of the invention include all those metals commercially employed as flake pigments, such as aluminum, zinc, copper, tin, nickel, iron and alloys thereof, such as gold bronze (an alloy of copper and zinc) or stainless steel (an alloy composed mainly of iron, nickel and chromium). Aluminum and gold bronze are preferred. There is no criticality to the particle size of the milled flakes, but a flake diameter range of 6 $\mu$m to 600 $\mu$m, preferably 10 $\mu$m to 300 $\mu$m is generally suitable. Advantageously, the particles produced are well flattened highly light reflective flake pigments.

Any compounds capable of inhibiting the reaction of the metal with water may be employed as corrosion inhibitors, for example phosphorus-, chromium-, vanadium- or silicon-containing compounds. They may be used individually or in admixture.

Suitable phosphorus compounds may be organic or inorganic. Simple inorganic phosphates, such as calcium or magnesium phosphate, or more complex phosphosilicate compounds may be used. The latter include calcium phosphosilicate, calcium strontium phosphosilicate and aluminum zirconium zinc phosphosilicate. An especially preferred member of this class is calcium strontium zinc phosphosilicate. organic phosphorus compounds include alkyl and dialkyl phosphates and phosphites, with the alkyl groups containing 2–20 carbon atoms. Iso-octyl acid phosphate may be particularly mentioned. Also suitable are phosphate esters of long chain ethoxylated alcohols. Preferred amongst these is Briphos S2D, a product of the Albright & Wilson company, which is an ethoxylated phosphate ester.

Silicon containing compounds capable of inhibiting the reaction of metals with water include organic silanes and silicates, especially tetraethyl silicate, and inorganic silicon compounds such as potassium silicate.

Salts of molybdenum, vanadium and tungsten, especially the ammonium salts, have also shown particular suitability in the process of the invention.

Chromium compounds suitable for the process of the invention include ammonium dichromate and chromic acid. In this class, the former is preferred as it is less aggressive towards metal grinding media.

Amongst the above corrosion inhibiting compounds, non-resinous organic or inorganic phosphates are especially preferred. They generally offer a high level of metal passivation with few health and safety concerns.

Lubricants suitable for the process of the invention are generally organic compounds recognised in the art as having surfactant properties. Non-ionic surfactants, such as ethylene oxide condensates with aliphatic alcohols or phenols are effective without affecting the pH of the system. In general it is desirable that the pH is kept as close to neutral as possible to assist in the prevention of corrosive attack of the metal surface. Such lubricants may also be advantageous in the metal segregation and recovery stages of the process, for example to overcome the surface tension of water to ensure efficient screening. Surprisingly, fatty acids, such as oleic and stearic acids, widely used as lubricants in the solvent based ball milling of metal powders, are also effective in the milling step, especially when made active in the aqueous phase by surfactants or by formation of a water soluble alkali salt. In the same way, water insoluble plasticisers may be used, for example phthalates such as dioctyl or diisodecyl phthalate, and adipates, such as dioctyl adipate.

Also suitable as lubricants are polyethylene oxides and glycols and polypropylene oxides and glycols of various molecular weights. Those displaying some water solubility are preferred.

It may also be desirable to add small quantities of organic compounds recognised in the art for their defoaming properties. For example, acetylenic diols may be used, but the inexpensive lower alcohols are also effective.

Advantageously, surfactants may be employed. Examples include anionic, non-ionic and cationic surfactants, including the solid alkyl ether phosphates such as the "Crodafos CS" (Registered Trade Mark) range of Croda Chemicals Ltd, alkylaryl sulphonates and their alkali metal derivatives such as alkali toluene sulphonates, alkali xylene sulphonates, alkali naphthalene sulphonates, alkali diisopropyl naphthalene sulphonates and alkali dodecyl benzene sulphonates; alcohol sulphates such has sodium lauryl alcohol sulphate, sulphosuccinates such as sodium dioctyl sulphosuccinate, sarcosinates such as lauroyl sarcosine and stearyl sarcosine; fatty amines such as stearylamine, and distearylamine; amine salts such as coconut fatty amine acetate; alkyl phenol ethoxylates such as nonyl phenol ethoxylate; alcohol ethoxylates such as higher ethoxylated oleyl alcohol; higher polyoxypropylene-polyoxy ethylene copolymers, such as alkylolamides such as myristic diethanolamide and coconut mono-isopropanolamide, esters such as propylene glycol monostearate and cetyl palmitate; maleic anhydride copolymers such as the disodium salt of maleic anhydride and di-isobutylene, and the SMA series of low molecular weight styrene-maleic anhydride copolymers.

Phosphate esters (eg Biophos S2D) which also have lubricating and/or corrosion inhibiting properties are preferred.

In a preferred embodiment, additive(s) having corrosion inhibiting, surface tension reducing and lubricating properties are present in the milling step.

Milling lubricants prevent cold welding of flakes which typically takes place during the ball milling process. The corrosion inhibitor and milling lubricant functions may be provided by a single chemical substance, for example a substituted phosphate ester (such as Briphos S2D), or the functions may be provided by two or more different materials.

There is no criticality to the mechanism of comminution. Any comminution process known in the art for metal flake production may be employed, providing the mechanical energy imparted is not so severe as to damage the metal flakes being formed. Ball milling is a widely operated process.

Neither is there any criticality to the grinding media, providing they do not react chemically with the other components during or after the comminution stage of the process. Stainless steel and high density ceramic grinding media are generally satisfactory.

Unwanted oversize or undersize metal flake particles are removed by any suitable means, such as screening of a slurry diluted by more water. The aqueous metal pigment slurry can then be concentrated to a paste by an convenient means, such as a filter press, ready for admixture with the organic binder medium.

Organic binder media include those organic materials habitually employed as binders in paints and inks or as plastics masterbatch carriers. The organic binder chosen is dependent on the envisaged end use of the product of the invention. Thus, if desired, the binder can be a solvent-soluble resin. As examples of organic binder media there may be mentioned cellulose acetate butyrate (CAB) and cellulose acetate propionate (CAP) resins, coumarone indene, epoxy esters, epoxide melamine and epoxide phenolic condensates, ketone, aldehyde, maleic and phenolic resins and also rosin, cellulose and petroleum derived resins, together with thermoplastic polymers, such as polyacrylates, polyolefins, polyvinyls, styrenics, polyamides, polyesters and copolymers thereof. Also suitable are natural and synthetic waxes, such as montan and paraffin wax and synthetic waxes such as polyethylene and polypropylene waxes. Where it is desired to introduce liquid organic binders, such as plasticisers, for example-to improve application properties, they are desirably added in minor proportions in combination with solid resins, to provide structural rigidity in the resulting metal pigment particles. Such plasticisers include mineral oils as well as phthalates such as dioctyl or diisodecyl phthalate, and adipates such as dioctyl adipate.

Gelatin and carrageenen are useful water soluble organic binders due to their suitability for food contact applications.

In a preferred embodiment the binder material is a non-resinous material.

The products of the invention are typically in a form, such as tablet, pellet, granule, flake or spherical bead, which provides the attributes of ease of handling, low- or non-dusting and meterability. Granules having a length of 5–20 mm, a cylindrical cross section and a diameter of 1.5–3 mm are preferred, as they have been found to offer optimum handling characteristics, especially in plastics applications where it is important to prevent stratification of polymer pellets and the particularly dense products of the invention. Apparatus used for the preparation of such physical forms is well known to those skilled in the art and is described in, for example, European Patent 0134676.

The function of the organic binder medium is to bind the metal pigment flakes together to prevent them becoming airborne as dust. Where the organic binder medium is soluble or dispersible in water, it may be added as an aqueous solution or dispersion. Where it is insoluble in water it is preferable to micronise the binder. In this latter case, the coherent paste of metal pigment, water and micronised organic binder medium is formed into particles, for example by mixing and extrusion, then dried at for example 60° C. to remove substantially all the water, then heat treated at elevated temperature, for example 100 to 130° C. for a short time, to fuse together the micronised organic binder medium and the metal pigment. This process is particularly suited to products for the plastics market, in which suitable organic binder media tend to be insoluble in water. It provides a final product form which has excellent colouristic and application properties when used in the injection moulding or extrusion of thermoplastics.

In extreme cases the chosen binder may be insoluble in water and unsuitable for micronising and fusion. In such cases the binder may be dissolved or dispersed in a suitable organic solvent prior to admixture with the metal pigment component. Such a solvent is desirably, though not essentially, water miscible.

In a preferred embodiment the metal is aluminum. Conveniently the lubricant is a mixture of a surfactant and a fatty acid, such as oleic or stearic acid. Oleic acid in an amount of 1 to 100%, preferably 2 to 60%, most preferably 3 to 8%, for example approximately 5%, by weight relative to the metal has been found to be effective in mixture with non-ionic surfactants at 5–1.5%. The corrosion inhibitor may advantageously be a phosphate ester having a polyethylene oxide side chain.

The invention is further illustrated by the following Examples in which all parts and percentages are by weight, unless otherwise stated.

EXAMPLE 1

To a cylindrical mill of diameter 21 cm were added:

5000 g of ⅛ inch (3.2 mm) diameter stainless steel balls;

500 g of distilled water;

100 g of fine particle size, aluminum powder; and 13 g of Briphos S2D, which had been pre-neutralised with triethanolamine—this makes the Briphos more soluble and reduces attack of the aluminum. Briphos S2D is a phosphated ester of a long chain ethoxylated alcohol manufactured by Albright and Wilson. The mill was rotated at 80 rpm for 4 hours and the aluminum pigment so formed separated from the steel balls by sieving, prior to recovery in a filter funnel.

In a laboratory mixer, a quantity of the aluminum flake pigment thus obtained, containing 25.0 g solids, was added to 10.7 g Hoechst Ceridust 3620, a micronised polyolefin wax with a particle size of less than 22 microns. The mixture was formed into granules by extrusion through a 2 mm diameter die, and dried in an oven held at a temperature of 60° C. ⁻+/−10° C. for two hours. The granules were then placed in an oven held at 115° C.+/−10° C. for 10 minutes to fuse the organic binder medium. 35.1 g of substantially water free, nondusting, free flowing, meterable granules of approx. 12 mm length and of good abrasion resistance were obtained.

A test piece made by injection moulding the granule in polystyrene at a level of 1% calculated on polymer weight, had a smooth, fine and bright silvery appearance.

EXAMPLE 2

The following mixture was milled in a cylindrical mill as described in Example 1, with the following formulation:

5000 g of ⅛ inch (3.2 mm) diameter stainless steel balls;

500 g of distilled water;

100 g of aluminum powder of approx. 33 μm average particle diameter;

13 g of Briphos S2D, which had been neutralized with triethanolamine;

2.85 g of Antarox V27, a linear $C_{8-10}$ aliphatic alcohol; ethoxylate/propoxylate alcohol manufactured by Phone-Poulenc Chemicals; and 0.15 g of Surfynol 104, an acetylinic diol from Air Products.

A quantity of the derived aluminum flake pigment paste, containing 24.1 g solids, was added to 10.3 g of FE 532-00, a micronised ethylene vinyl acetate resin sold by Croxton and Garry. The mixture was granulated, dried and heat treated as in Example 1. A test piece made by injection moulding the granule in polypropylene at a level of 3%, calculated on polymer weight, had a bright, highly sparkling, silvery appearance.

EXAMPLE 3

The method of Example 1 was repeated with the substitution of Hoechst Ceridust 3620 by an equal weight of Polyox WSR 301, a solid, non-ionic, high molecular weight, water-soluble, polyethylene oxide polymer. The mixture was formed into granules by extrusion through a 2 mm diameter die, and dried in an oven held at a temperature of 50° C.+/−10° C. for four hours. 35.2 g of substantially water free, non-dusting, free flowing, meterable granules of approx. 12 mm length and of good abrasion resistance were obtained.

An aqueous printing ink was prepared by combining the following:

20 g of the granule product of this Example, dispersed in 25 g water and let down with 53 g Zinpol 132, an acrylic resin emulsion of 40% solids, supplied by Worlee Chemie and 2 g waxes and defoaming additives.

The ink thus formed was stable to gassing and provided a smooth, bright metallic silver effect when printed on a paper substrate.

EXAMPLE 4

10 g Halox ZSP 391, a calcium strontium zinc phosphosilicate compound, sold by Halox Pigments of Hammond, Ind., United States of America.

3 g oleic acid, 5 g Pluriol 600, a polypropylene glycol supplied by BASF A.G., and 50 g deionised water were high speed stirred to solution.

35.1 g of solution, 219.4 g deionised water, and 30 g atomised aluminum powder of approx. 8 μm average particle diameter were set on a vibratory mill with 1500 g ⅛ inch (3.2 mm) diameter stainless steel balls, in a rigid plastic pot. After 4 hours, the contents were removed and separated from the steel balls. Water was added to a metal concentration of about 3% and the slurry screened on a 400 mesh screen. The undersize fraction was concentrated in a filter press to about 80% metal content, then combined with Microthene 532-00, an ethylene vinyl acetate polymer sold by Croxton & Garry Ltd, by the fusion process of Example 1.

When injection moulded at 1.5% w/w in polypropylene, the granule exhibited a particularly bright, reflective silver coloration, with good dispersion.

The dispersibility characteristics of this product can be further enhanced by replacing up to 30% of the Microthene by a high boiling mineral oil such as Kaydol, manufactured by Witco.

EXAMPLE 5

200 g Halox SZP-391

100 g Pluriol P600

100 g Antarox V27

100 g water and 60 g oleic acid were high speed stirred for 10 minutes to form a homogeneous mixture. To a cylindrical mill of diameter 21 cm were added: 5000 g of ⅛ inch (3.2 mm) diameter stainless steel balls, 75 g of the above mixture, 100 g aluminum powder of 91 m median particle diameter and 375 g of distilled water.

The mill was rotated at 105 rpm for 6 hrs to form a flake pigment product of approximately 25 μm median particle diameter. The grinding media were removed on a coarse screen and the product itself screened on a 400 mesh (38 μm) screen using water as the washing liquid. The flake passing through the screen was concentrated on a filter funnel. When. converted to a granule and tested in the water based ink system of Example 3, this material provided a bright silver effect with good coverage and good adhesion to a paper substrate.

The Halox SZP-391 of this Example may be replaced by members of the Heucophos range of multiple metal phosphates manufactured by Heubach GmbH, with similar results.

EXAMPLE 6

19 g Antaroz V27 and 1 g Surfynol 104 were warmed and mixed together to form a homogeneous liquid, which was mixed into 120 g of the water based paste intermediate of Example 1, containing 80 g metal, to form a stiff paste. The paste was extruded through a 2.5 mm diameter die into strands and the water removed by drying at 70° C. The resulting dry strands were broken up into granules of approximately 1 cm length. An aqueous ink was prepared by predispersing the granules in a small quantity of water into which the Zinpol medium of Example 3 ws thereafter blended. A bright ink, with good stability and coverage was obtained.

The Antarox and Surfynol in this example may be replaced by 20 g of the natural product carrageenen in powder form with similar results. Such a granule has particularly good shelf life and redispersion in water.

EXAMPLE 7

To a 0.5 litre capacity vibratory pot mill were added:

1.5 kg of 2.4 mm diameter ceramic grinding media, 150 g water, 30 g aluminum powder of 7 μm average particle diameter, 2.5 g iso-octyl acid phosphate and sufficient 25% aqueous ammonia to maintain the pH at approximately 7.

The charge was milled for 3 hrs then recovered, screened, formed into granules and tested as in Example 5. The printed ink had similar brightness, but superior coverage to that of Example 5.

EXAMPLE 8

To 0.5 litre capacity vibratory pot mill were added:

1.5 kg of 3 mm diameter stainless steel grinding media, 150 g water, 30 g aluminum powder of 7 μm average particle diameter, 2.4 g Briphos S2D and 0.6 g 25% aqueous ammonia.

The charge was milled for 4 hrs, then discharged with water and screened on a 400 mesh (38 μm) screen. The fraction passing through the screen was collected and concentrated under vacuum in a filter funnel. A quantity of the filter cake, corresponding to 80 g metal was thoroughly mixed with 20 g of a commercial source of $C_{2-14}$-aliphatic alcohols. The stiff paste was formed into pellets and the water removed at 65° C. The resulting product had good stability and colouristic properties in a one pack UV curing resin system.

EXAMPLE 9

The milled, screened and recovered paste product of Example 8 was mixed with micronised Laropal K80 ketone resin, manufactured by BASF AG in the ratio 80 parts by weight of metal to 20 parts by weight of resin. The mixture was formed into granules by extrusion and the water removed in an oven of 70° C.

When tested in a solvent based ink, the granular product displayed similar characteristics to a granule prepared by the methods described in EP-A-0134676 using a conventional solvent milled paste as starting material.

EXAMPLE 10

An amount of the milled, screen and recovered paste product of Example 8 corresponding to 80 g metal was placed in a 1 litre beaker fitted with a propeller agitator set at 400 rpm. With agitation there were then added, 530 g Dowanol PB29, an ether-alcohol solvent of the Dow Chemical Co, 26.7 g of 25% aqueous ammonia, 20 g tetraethyl silicate and finally another 26.7 g of 25% aqueous ammonia.

The mixture was agitated for 5 minutes, then there was added another 26.7 g of 25% aqueous ammonia.

After a further two hours mixing, air was bubbled through the slurry for 2 hours to remove excess ammonia and the metal recovered on a Buchner filter. Thereafter, the filter cake was converted to a gold pigment by the process of Example 1 of our co-pending British Patent Application No 9609507.0 (ie was stirred at 600 rpm with a paddle agitator for one hour, then filtered under vacuum on a Buchner funnel, and washed with excess water. The product was a viscous paste dispersible in both water and oxygen-containing hydrocarbon solvents) and then to a granule by the process of Example 25 of EP-A-0134676. The granules so formed provided a rich gold coloration in water based paints and inks.

EXAMPLE 11

2 g of oleic and 2 g of Antarox V27 and Surfynol 104 in 19:1 weight ratio were mixed together and added dropwise to 140 g vigorously stirred water in a beaker containing 1 g isopropanol, to form an emulsion. There was then added 4 g hydrogen peroxide (30%w/w; 100 volume) and the whole added to 30 g A 7401 atomised aluminum powder of 8 $\mu$m average particle diameter in a ball milling pot of 500 ml volume containing 1500 g spherical, stainless steel grinding media of 3 mm average diameter.

The pot was sealed and placed on a vibratory mill for 4 hours. The charge was washed out with 200 g water, screened on a 400 mesh screen and an aqueous paste recovered by vacuum filtration. The water was removed by drying at 50° C. and 16 g of the resulting fine flake powder incorporated into 8.89 g Worleesol 31, a modified linseed oil polymer (supplied by Worlee Chemie as a 45% solution in 80/20 w/w water/2-butoxy ethanol), further diluted in 3.5 g of a 60/40 weight ratio mixture of water and isopropanol.

After forming into granules and evaporating the volatiles at 60° C., the soft, dry product was found to give a bright, high coverage silver finish in an exclusively isopropanol based or water/isopropanol based varnish.

EXAMPLE 12

A formulation comprising 1500 spherical, ceramic grinding media of 3 mm average diameter, 150 g water, 30 g aluminum powder of 8 $\mu$m average particle diameter, 2.4 g Crodafos 25D5A, an ethoxy (5) $C_{12-15}$ alcohol acid phosphate ester, supplied by Croda Ltd and 0.6 g ammonia, 25% in water was loaded into a 500 ml pot and milled on a vibratory mill for 3 hours.

The grinding media was removed on a coarse screen and the metal flake pigment product screened on a 400 mesh (38 $\mu$m) screen using water as the washing liquid. The flake passing through the screen was concentrated on a filter funnel. When converted to a granule with a carrageenan carrier and tested in the water based ink system of Example 3, this material provided a bright silver effect with good coverage.

EXAMPLE 13

The method of Example 12 was repeated with the substitution of Crodafos 25D5A by an equal weight of Crodafos T5A, an ethoxy (5) isotridecanol acid phosphate ester. Similar results were obtained on conversion to a granule and testing as described therein.

EXAMPLE 14

The method of Example 12 was repeated with the substitution of Crodafos 25D5A by an equal weight of Crodafos N10N, an ethoxy (10) oleyl alcohol phosphate ester diethylamine salt. Similar colouristic results were obtained on conversion to a granule and testing as described therein. This material, however, also had outstanding adhesion to the paper substrate, as demonstrated by a tape test.

EXAMPLE 15

A formulation comprising 1500 spherical, stainless steel grinding media of 3 mm average diameter, 150 g distilled water, 30 g aluminum powder of 254 m average particle diameter and 2 g octyl phosphonic acid was charged to a 500 ml pot and milled on a vibratory mill for 1.5 hours.

After removing the grinding media, the milled material was screened on a 325 mesh (45 $\mu$m) screen and recovered as a granule by the method of Example 12 using as carrier a water soluble part hydrolysed polyvinyl acetate resin. The 80% metal content granule provided a very bright, sparking coating based on Joncryl 537, an aqueous acrylic industrial paint resin manufactured by S C Johnson.

EXAMPLE 16

Aluminum pigment, made by the process of example 1 as ha water carried paste containing 40 g of aluminum metal, was mixed with 13.3 g of Beetle BE 370, hexamethoxymethyl melamine from BIP Speciality Resins Ltd. The mixture was formed into granules by extrusion through a 2 mm diameter die, and dried in an oven held at a temperature of 60° C. for 16 hours.

An aqueous printing ink was made by dispersing 5 g of the dried granule in 5 g of distilled water, and then mixing this dispersion with 15 g of Glascol LS2, a colourless water-based ink from Allied Colloids. A drawdown on to white paper showed that the product had a bright metallic silver colour.

EXAMPLE 17

The procedure of example 16 was repeated with the Beetle BE 370 replaced by RC-294-J427, an acetylenic diol surfactant from Air Products and Chemicals Inc. The dried granular product so formed gave a brilliant metallic silver effect when made up into a Glascol LS2 ink.

EXAMPLE 18

A dispersion of 7.5 g Molywhite 212, a basic calcium zinc molybdate from Sherwin Williams Chemicals 1.5 g oleic acid 2.5 g Pluriol P600

2.5 g Antarox V27

25.0 g distilled water was added to 30 g of a fine particle size aluminum powder 100 g distilled water 1500 g of ⅛ inch diameter stainless steel balls and milled on a vibratory mill for 3.5 hours.

A flaked aluminum paste product was extracted from the grinding media. If required, the paste can be converted into granular form as described in previous Examples.

What is claimed is:

1. A process for preparing a low- or non-dusting, substantially non-volatile metal flake pigment composition, said process comprising ball milling atomised metal powder in the presence of a milling fluid, together with one or more additive(s) which together exhibit lubricating, corrosion inhibiting and surfactant properties, wherein the lubricant is not suet; wherein said milling fluid consists of water with a maximum content of organic solvent of 10% by weight.

2. A process as claimed in claim 1 which includes the step of screening the milled composition to select particles of a pre-selected size.

3. A process as claimed in claim 1 and which includes the step of forming a coherent paste of an organic binder medium, water and metal flake pigment.

4. A process for preparing a low- or nondusting, substantially non-volatile metal flake pigment composition, said process comprising:

(a) ball milling atomised metal powder in the presence of a milling fluid, together with either an additive having both lubricating and corrosion inhibiting properties or with a lubricant and at least one corrosion inhibitor, wherein said milling fluid consists of water with a maximum content of organic solvent of 10% by weight, to produce a metal flake pigment; and (b) forming a coherent paste of an organic binder medium, water and said metal flake pigment, wherein said paste is formed by mixing a first component comprising organic binder medium and a second component comprising said metal flake pigment, with either or both of the first and second components comprising water and the paste containing from 3–70% of the organic binder medium based on the weight of the metal flake pigment, and either sub-dividing the coherent paste into particles and removing substantially all volatile liquids from the particles, or removing substantially all volatile liquids from the coherent paste and sub-dividing the resulting mass into particles, at least 98% by weight of the resulting particles being retained on a sieve having 150 μm aperture and each containing a plurality of metal pigment particles dispersed in a matrix of organic binder medium, wherein the organic binder medium binds the metal flake pigment particles by either precipitation from solution during volatile liquid removal, or sintering or melting at elevated temperature and fusion.

5. A process as claimed in claim 4 wherein said lubricant comprises an ethylene oxide condensate with alcohols or phenols, and a fatty acid or a derivative thereof.

6. A process as claimed in claim 4 wherein said corrosion inhibitor is a phosphorus-, chromium-, vanadium- or silicon-containing compound.

7. A process as claimed in claim 6 wherein said corrosion inhibitor is a phosphate ester having a polyethylene oxide side chain.

8. A process as claimed in claim 4 wherein a single moiety acts as lubricant and corrosion inhibitor.

9. A process as claimed in claim 8 wherein said moiety is a phosphate ester having a polyethylene oxide side chain.

10. A process as claimed in claim 4 wherein a surfactant is present in said milling step.

11. A process as claimed in claim 4 wherein the metal pigment is an aluminum, zinc, copper, tin, nickel or iron pigment or a pigment of an alloy comprising aluminum, zinc, copper, tin, nickel, or iron.

12. A process as claimed in claim 4 wherein the metal pigment is an aluminum or gold bronze pigment.

13. A process as claimed in claim 4 wherein the metal pigment is a light reflective pigment.

14. A process as claimed in claim 4 wherein the metal pigment is aluminum, the lubricant is oleic acid and the corrosion inhibitor is a phosphate ester having a polyethylene oxide side chain.

15. A process as claimed in claim 4 which includes a step of treating the metal pigment flakes whilst in an aqueous system following the melting step and prior to forming the metal pigment particles.

16. A process as claimed in claim 15 wherein said milled metal pigment flakes are treated with chromate, coated with silica or coated with alumina.

17. A process as claimed in claim 4 wherein said pigments are coated with micronised binder before particle formation and then sintered to produce said metal pigment particles.

18. An organic solvent-free paste comprising a ball-milled metal flake pigment, water and agent(s) having lubricating and corrosion inhibiting properties, wherein said metal flake pigment is produced by ball-milling metal powder in a water-based milling fluid.

19. A paste as claimed in claim 18 comprising ball-milled aluminum or gold bronze flake pigment, water and a phosphate ester having a polyethylene oxide side chain.

20. A metal pigment composition in granular form containing a plurality of milled metal flake pigments dispersed in a matrix of organic binder medium without any organic solvent present wherein said milled metal flake pigments are provided by milling using a water-based milling fluid.

21. A metal pigment composition in granular form as claimed in claim 20 which is produced by sintering and wherein said metal flake pigments are dispersed in a matrix of micronised organic binder medium.

* * * * *